(12) United States Patent
Fodor et al.

(10) Patent No.: US 8,263,734 B2
(45) Date of Patent: Sep. 11, 2012

(54) SYSTEM AND METHOD FOR REDUCING OFF-GASSING OF POLYPHENYLENE SULFIDE

(75) Inventors: Jeffrey S. Fodor, Rexford, NY (US); Aubrey South, Jr., Claremore, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 315 days.

(21) Appl. No.: 12/371,275

(22) Filed: Feb. 13, 2009

(65) Prior Publication Data

US 2010/0210813 A1 Aug. 19, 2010

(51) Int. Cl.
*C08G 75/14* (2006.01)
(52) U.S. Cl. ........ 528/388; 528/488; 528/489; 528/499; 528/389
(58) Field of Classification Search ............ 528/388, 528/488, 489, 499
See application file for complete search history.

(56) References Cited

U.S. PATENT DOCUMENTS

| | | | |
|---|---|---|---|
| 5,110,901 A | 5/1992 | Hoover et al. | |
| 5,126,431 A | 6/1992 | Nesheiwat | |
| 5,180,796 A | 1/1993 | Sutherlin | |
| 5,210,128 A | 5/1993 | Johnson | |
| 5,219,983 A | 6/1993 | Yu et al. | |
| 5,235,032 A | 8/1993 | Geibel et al. | |
| 5,266,680 A | 11/1993 | Reed | |
| 5,354,841 A | 10/1994 | Geibel et al. | |
| 5,374,709 A | 12/1994 | Clark, Jr. et al. | |
| 5,929,203 A | 7/1999 | Ash et al. | |
| 6,082,380 A | 7/2000 | Geibel et al. | |
| 6,242,501 B1 | 6/2001 | Green et al. | |
| 6,281,326 B1 | 8/2001 | Ash et al. | |
| 6,307,011 B1 | 10/2001 | Fodor et al. | |
| 6,331,608 B1 | 12/2001 | Vidaurri et al. | |
| 6,562,238 B1 | 5/2003 | Fodor et al. | |
| 7,312,300 B2 | 12/2007 | Mitchell | |
| 2006/0189786 A1 | 8/2006 | Mitchell | |

FOREIGN PATENT DOCUMENTS

| | | |
|---|---|---|
| DE | 19915705 A1 | 10/2000 |
| EP | 0536684 A1 | 4/1993 |
| EP | 0577098 A1 | 1/1994 |
| EP | 1106643 A2 | 6/2001 |
| EP | 1440996 A1 | 7/2004 |
| EP | 1577336 A1 | 9/2005 |
| EP | 1580213 A1 | 9/2005 |
| EP | 1586601 A1 | 10/2005 |
| WO | WO 0032644 A1 | 6/2000 |
| WO | WO 0039196 A1 | 7/2000 |

OTHER PUBLICATIONS

Definition of FLASH, on-line Merriam-Webster Dictionary, 2011.*
International Search Report and Written Opinion, PCT/US10/023805, May 7, 2010, 15 pages.

* cited by examiner

*Primary Examiner* — Randy Gulakowski
*Assistant Examiner* — Shane Fang
(74) *Attorney, Agent, or Firm* — Fletcher Yoder P.C.

(57) ABSTRACT

The techniques provide a system and a method of producing polyphenylene sulfide (PPS) polymer. The PPS polymer is produced by reacting a sulfur source and a dihaloaromatic compound in the presence of a polar organic compound in a polymerization mixture in a polymerization vessel. The PPS polymer is washed with a base to lower the oligomer content of the PPS polymer and thus the off-gassing during processing.

17 Claims, 4 Drawing Sheets

SYSTEM AND METHOD FOR REDUCING OFF-GASSING OF POLYPHENYLENE SULFIDE

BACKGROUND

The present technique relates generally to production of polyphenylene sulfide (PPS). In particular, the present technique relates to washing PPS with a base (e.g., sodium hydroxide) to reduce the amount of off-gassing during the subsequent melt processing of the PPS.

This section is intended to introduce the reader to various aspects of art which may be related to various aspects of the present techniques that are described and/or claimed below. This discussion is believed to be helpful in providing the reader with background information to facilitate a better understanding of the various aspects of the present techniques. Accordingly, it should be understood that these statements are to be read in this light, and not as admissions of prior art.

Polyphenylene sulfide (PPS), a member of a more general class of polymers known as poly(arylene) sulfide (PAS), is a high-performance engineering thermoplastic that may be heated and molded into desired shapes in a variety of manufacturing, commercial, and consumer applications. PPS may be used in the preparation of fibers, films, coatings, injection molding compounds, and fiber-reinforced composites, and is well-suited for demanding applications in appliance, automotive, and electrical/electronic industries. PPS may be incorporated as a manufacturing component either alone or in a blend with other materials, such as elastomeric materials, copolymers, resins, reinforcing agents, additives, other thermoplastics, and the like. Initially, PPS was promoted as a replacement for thermosetting materials, but has become a suitable molding material, especially with the addition of glass and carbon fibers, minerals, fillers, and so forth. In fact, PPS is one of the oldest high-performance injection molding plastics in the polymer industry, with non-filled grades commonly extruded as wire coatings.

PPS polymer is an attractive engineering plastic because, in part, it provides an excellent combination of properties. The molecular structure of PPS may readily form a thermally stable crystalline lattice, providing PPS with a semi-crystalline morphology and a high melting point, which may range from about 265° C. to about 315° C. Because of its molecular structure, PPS may char during combustion, making the material inherently flame resistant. Further, PPS is resistant to aggressive chemical environments, e.g., not dissolving in solvents of temperatures below about 200° C., and may become precision molded to tight tolerances. In summary, PPS is thermally stable, inherently non-flammable without flame retardant additives, and possesses excellent dielectric and insulating properties. Other properties include dimensional stability, high modulus, and creep resistance. The beneficial properties of PPS are due in part, to the stable chemical bonds of its molecular structure, which impart a relatively high degree of molecular stability (and therefore resistance) toward both thermal degradation and chemical reactivity.

Although the properties of PPS structures were known since the early 20th century, an industrially viable synthesis was only developed in the late 1960s. In 1967, Phillips Petroleum Company of Bartlesville, Okla. disclosed a method for producing PPS through the reaction of para-dichlorobenzene and sodium sulfide, as illustrated by the reaction below.

This condensation polymerization (or step polymerization) marked the beginning of industrial-scale commercialization of PPS. In 1972, Phillips Pertroleum Company began commercial-scale production of PPS, and this PPS was soon noted for having an effective balance of thermal and chemical resistances, nonflammability, and electrical insulating properties. Today, PPS is manufactured and sold under the trade name Ryton® PPS by Chevron Phillips Chemical Company LP of The Woodlands, Tex. Other sources of PPS include Ticona, Toray, and Dainippon Ink and Chemicals, Incorporated, among others.

PPS may be blended or compounded with various additives to provide desired properties. The PPS may be may be heated, melted, extruded, and molded into desired shapes and composites in a variety of processes, equipment, and operations. The PPS may be subjected to heat, compounding, injection molding, blow molding, precision molding, film-blowing, extrusion, and so forth, depending on the desired application.

However, off-gassing of PPS can be a problem during melt processing of the PPS resin. Such off-gassing has been observed to be more prevalent in, but not limited to, PPS produced wherein the polymerization step is terminated via flashing process solvent from the polymerization solution. A higher degree of off-gassing of PPS resins can lead to a number of undesirable processing complications, such as mold plate-out, melt bubbles, PPS product or defects, and so on. There exists a need for methods to produce lower off-gassing PPS. Presently, there exists a significant need for lower off-gassing flash resins in the marketplace.

SUMMARY OF THE INVENTION

An aspect of the invention relates to a method of producing polyphenylene sulfide (PPS) polymer, including: reacting a sulfur source and a dihaloaromatic compound in the presence of a polar organic compound in a polymerization mixture in a polymerization vessel to form a PPS polymer; flashing at least a portion of the polar organic compound from the polymerization mixture to terminate the reaction of the sulfur source and the dihaloaromatic compound; and washing the PPS polymer with a base or a solvent, wherein washing with the base or solvent lowers the off-gassing of the PPS polymer.

An aspect of the invention relates to a method of producing polyphenylene sulfide (PPS) polymer, including: reacting a sulfur source and a dihaloaromatic compound in a presence of a polar organic compound in a polymerization mixture in a polymerization vessel to form a PPS polymer; and washing the PPS polymer with a base or a solvent, wherein washing lowers an oligomer content of the PPS polymer.

An aspect of the invention relates to a process for manufacturing a product comprising PPS polymer, the process including: forming a PPS polymer into a product, the PPS polymer being produced by a method comprising: reacting a sulfur source and a dihaloaromatic compound in a presence of a polar organic compound in a polymerization mixture in a polymerization vessel to form the PPS polymer; and washing the PPS polymer with a base or a solvent to lower an oligomer content of the PPS polymer.

BRIEF DESCRIPTION OF THE DRAWINGS

Advantages of the present techniques may become apparent upon reading the following detailed description and upon reference to the drawings in which.

DETAILED DESCRIPTION OF SPECIFIC EMBODIMENTS

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

I. Introduction

PPS is a polymer comprising at least 70 mole, or alternatively 90 mole %, of para-phenylene sulfide units. The structure for the para-phenylene sulfide unit is provided shown below.

PPS may further comprise up to 30 mole %, or alternatively up to 10 mole %, of recurring units represented by one or more of the following structural formulas:

The present techniques are directed to washing PPS with a base (e.g., sodium hydroxide or NaOH) or other solvent (e.g., NMP) during polymerization and/or after polymerization to reduce off-gassing of PPS during the subsequent melt processing of the PPS. Without being limited by theory, it is believed that the base washing of the PPS may lower the concentration of low molecular weight oligomers and/or other components that contribute to PPS off-gassing during the subsequent melt-processing of the PPS. Additionally, it is believed that the base washing may cause a change in the end-group chemistry of the PPS which may facilitate the extraction of low molecular weight oligomers and/or other off-gassing components during the processing of PPS prior to melt processing (e.g., during subsequent washing with water, solvent, acid, etc.). Furthermore, it should be noted that base washing will affect crystallization of the PPS during subsequent processing. Depending on the end use of the polymer, such an effect may be beneficial. Further, washing with solvents, such as NMP, may generally remove contaminants that may lead to off-gassing of the PPS during subsequent processing.

PPS may be base washed during polymerization by adding a base to the polymerization mixture wherein the added base is in addition to any base necessary to carry out the PPS polymerization. Alternatively, the PPS may be base washed after polymerization (i.e., after substantial termination of the polymerization) by washing the polymer with a base in the polymerization reactor or downstream of the polymerization reactor. The PPS may be base washed by adding the base to an existing wash (such as a water wash), and so on. Alternatively, the PPS may be base washed prior to or after other typical washes (e.g., water washes, slurry acid washes, calcium washes, etc.). In the various options for base washing the PPS before and after termination of the polymerization reaction, the amount of base added may be selected to raise the pH of the PPS slurry to a desired value, and/or to add a desired mass ratio of base to PPS. In an embodiment, the PPS is washed with a base solution having a pH greater than 10, or greater than 10.5. In other embodiments, the PPS is washed with a base solution having a pH ranging from 10 to 14, or from 10.5 to 12. In contrast, the pH of the SMAB/NaSH solution during the reaction may generally be about 9.5. In some embodiments the PPS is washed with an aqueous base. In other embodiments, the PPS is washed with a base in an organic solvent.

Generally, the base may be any base capable of producing a solution with the desired pH. In an embodiment, the base may be a Brönsted base. In some embodiments, the base may be alkali metal hydroxide or an alkaline metal hydroxide. For example, the base may be lithium hydroxide, sodium hydroxide, or potassium hydroxide; alternatively, sodium hydroxide; or alternatively, potassium hydroxide. In other embodiments, the base may be magnesium hydroxide or calcium hydroxide. Generally, the alkali metal hydroxide may be present in an aqueous solution.

In further embodiments, the base may be an alkali metal alkoxide. The alkoxide portion of the alkali metal alkoxide may be any $C_1$ to $C_5$ alkoxide. In some embodiments, the alkoxide fragment may be methoxide, ethoxide, n-propoxide, iso-propoxide, n-butoxide, sec-butoxide, or t-butoxide. In embodiments, the alkali metal alkoxide may be present in solution with an organic solvent. In some embodiments, the alkali metal alkoxide is present in an alcohol from which the alkoxide portion of the alkali metal alkoxide is derived. In other embodiments, the alkali metal alkoxide solution may be produced by contacting an alkali metal hydroxide and an alcohol. In some embodiments, the alcohol may be methanol, ethanol, n-propanol, iso-propanol, n-butanol, sec-butanol, or t-butanol. In an embodiment, the alkali metal of the alkali metal alkoxide may be sodium or potassium.

Generally, the PPS may be contacted with the basic wash solution for a time period and/or temperature sufficient to reduce the off-gassing during the melt processing of the PPS. The time and temperature of contact of the basic wash solution are independently described herein and may be utilized in any combination to describe the contacting of the basic wash solution and the PPS. In an embodiment, the PPS may be contacted with the basic wash solution for a time ranging from 10 seconds to 60 minutes, such as 20 seconds to 30 minutes or 30 seconds to 20 minutes. In an embodiment, the PPS may be contacted with the basic wash solution a temperature ranging from 250° F. to 500° F.; alternatively, 300° F. to 400° F.; or alternatively, 325° F. to 375° F.

A base solution may be added to the wash in an amount to yield a pH generally greater than 10; greater than 10.5; ranging from 10 to 14; or alternatively, ranging from 10.5 to 12. The base solution to be added may have a variety of concentrations and the exact concentration is not particularly important as long as the desired pH of the wash solution can be achieved. Two common base solution concentrations include 50%, by weight, and 35%, by weight. Generally, a 35%, by weight, concentration solution is commonly available and usually chosen. The washing may be conducted in a batch or continuous fashion. Base may be added to a batch process to contact the PPS, followed by heating to the desired temperature, then cooling to a temperature appropriate for the solid liquid separation method desired (any appropriate solid-liquid separation can be used). Following the separation the PPS and be further washed to remove any excess base and impurities. Alternatively, the PPS may be washed continuously by adding base to a feed slurry that is continuously being fed to heat exchanger that first heats then cools the slurry. The exiting slurry from the feed exchanger may be sent directly to continuous solid-liquid separation equipment within which washing may also be completed, or alternatively washing may be completed following this first separation step. The contact and processing time generally follow that described above. The quantities of PPS washed and slurry concentrations may vary widely, depending on the process equipment desire to complete the operation. The slurry may be kept between about 1 wt % solids and about 35 wt. % solids, or around 10 wt. % solids.

II. Production of Polyphenylene Sulfide (PPS)

Figure 1:
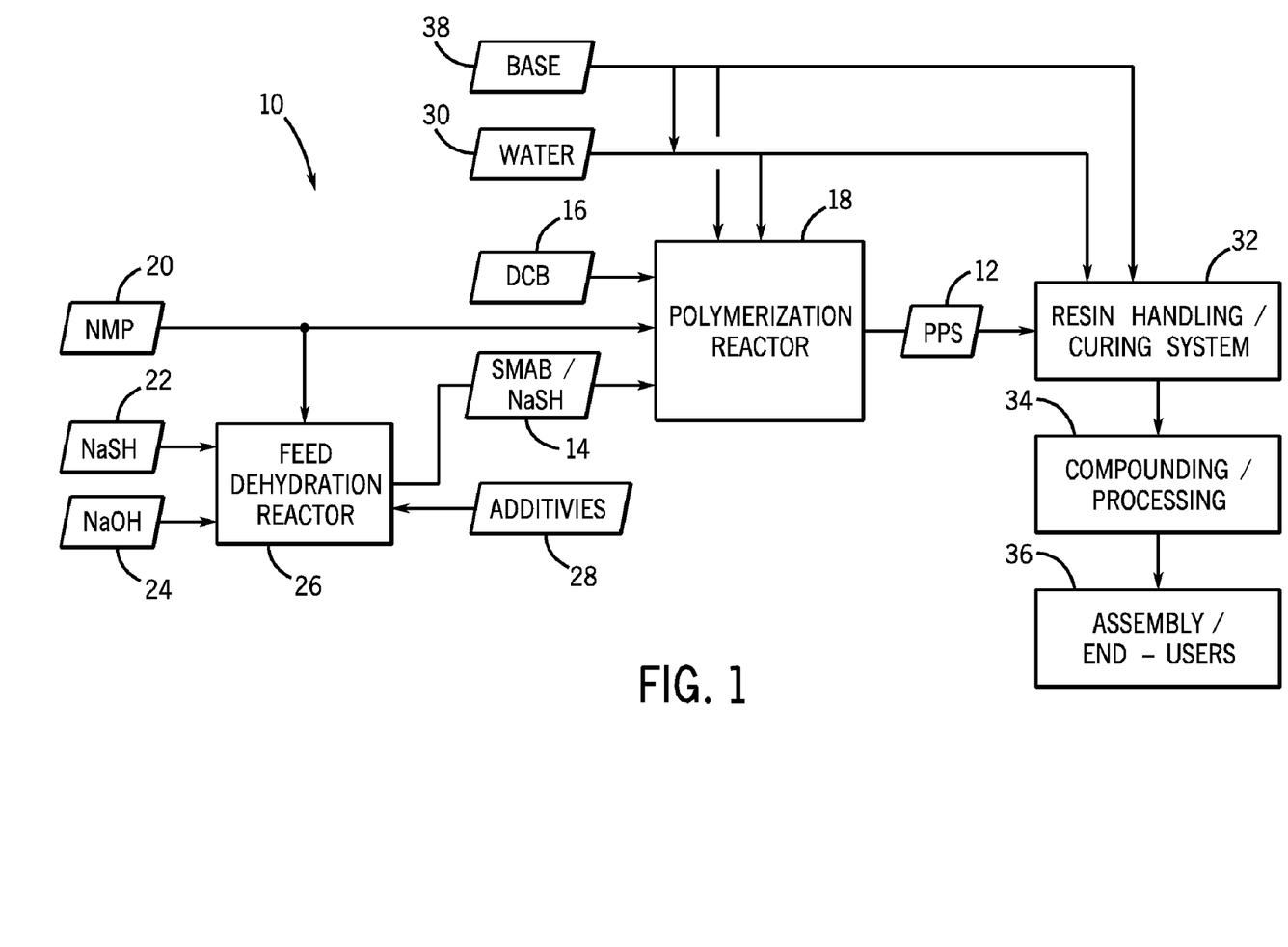
FIG. 1 is a block flow diagram depicting an embodiment of a system for producing polyphenylene sulfide (PPS) in accordance with embodiments of the present techniques.

Turning now to the drawings, and referring initially to FIG. 1, a block flow diagram of an exemplary polyphenylene sulfide (PPS) manufacturing system generally designated by reference numeral 10 is depicted.

A. Components of the PPS Polymerization Reaction Mixture

As illustrated in FIG. 1, PPS 12 may be produced by the condensation polymerization of a sulfur compound (e.g., a sulfur compound in the SMAB/NaSH 14) with a dihaloaromatic compound, e.g. para-dichlorobenzene (DCB) 16, in a polymerization reactor 18. A polar organic compound, such as n-methyl pyrrolidone (NMP) 20 may be used as the reaction solvent. While the feeds in FIG. 1 are labeled with specific compounds, other compounds and reagents may serve the same function as those indicated. Various materials that may be used are discussed in the sections that follow. The polymerization is generally exothermic and the polymerization reactor 18 may be equipped with a jacket, internal cooling coils, or both, which may be supplied with a cooling medium, such as cooling tower water, as discussed with respect to FIG. 2. Finally, agitation of the reaction mixture, such as through the use of a reactor stirrer or agitator, may advance the polymerization by improving contact of the reactants, improving heat transfer, dispersing different phases (e.g., solid/liquid, liquid/liquid, and the like), and so forth.

1. PPS Polymerization Reactants

As mentioned, the two primary reactants generally used for the production of a PPS polymer are a dihaloaromatic compound (e.g., DCB 14) and a sulfur compound (e.g., SMAB/NaSH 12).

a. Dihaloaromatic Compound as a PPS Reactant

Some of the dihaloaromatic compounds which may be employed may be represented by the formula:

where $X^1$ and $X^2$ may independently be selected from fluorine, chlorine, bromine, and iodine, and $R^1$, $R^2$, $R^3$, and $R^4$ may independently be selected from hydrogen and a hydrocarbyl radical. In some embodiments, X may be selected from chlorine, bromine, and iodine. In an embodiment, the hydrocarbyl radical can be an alkyl, cycloalkyl, or aryl radical or combination thereof such as alkaryl, aralkyl, or the like; alternately, alkyl radical; alternatively an aryl radical. In an embodiment, the dihaloaromatic compounds may have from 6 to 30 carbon atoms; alternatively, from 6 to 24 carbon; or alternatively, from 6 to 15 carbon atoms. In an embodiment, $X^1$ and $X^2$ may each be fluorine; alternatively, chlorine; alternatively, bromine; or alternatively, iodine. The hydrocarbyl radical or alkyl radical may be any hydrocarbyl radical having from 1 to 20 carbon atoms; alternatively, from 1 to 15 carbon atoms; alternatively, from 1 to 10 carbon atoms; or alternatively, from 1 to 5 carbon atoms. The aryl radical may be any aryl radical having from 6 to 15 carbon atoms or, alternatively, 6 to 10 carbon atoms. In some embodiments, each alkyl radical may independently be a methyl, ethyl, n-propyl(1-propyl), isopropyl(2-propyl), n-butyl(1-butyl), sec-butyl(2-butyl), isobutyl(2-methyl-1-propyl), tert-butyl(2-methyl-2-propyl), n-pentyl(1-pentyl), 2-pentyl, 3-pentyl, 2-methyl-1-butyl, tert-pentyl(2-methyl-2-butyl), 3-methyl-1-butyl, 3-methyl-2-butyl, neo-pentyl(2,3-dimethyl-1-propyl) radical, n-hexyl, n-octyl, n-decyl, or n-dodecyl radical. Other alkyl radicals having from 1 to 15 carbon atoms may be used. In an embodiment, the aryl group may be a phenyl group or substituted phenyl group. The halogen atoms can be in any position in the dihaloaromatic compound. In some embodiments, p-dihalobenzenes or substituted p-dihalobenzenes may be employed as the dihaloaromatic compound. Examples of p-dihalobenzenes that may be used either singly or as a mixture of two or more include p-dichlorobenzene (DCB), p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromo-benzene, 1-hexyl-3-dodecyl-2,5-dichlorobenzene, 1-octadecyl-2,5-diidobenzene, 1-phenyl-2-chloro-5-bromobenzene, 1-(p-tolyl)-2,5-dibromobenzene, 1-benzyl-2,5-dichlorobenzene, and 1-octyl-4-(3-methylcyclopentyl)-2,5-dichloro-benzene, among others. The selection of an appropriate precursor compound depends on a number of factors, including availability and effectiveness. For example, a typical dihaloaromatic compound that may be employed in an embodiment is p-dichlorobenzene (DCB 14) due to its availability and effectiveness.

b. A Sulfur Compound as a PPS Reactant

Sulfur compounds which may be employed in the PPS polymerization process include, for example, thiosulfates, thioureas, thioamides, elemental sulfur, thiocarbamates, metal oxysulfides, thiocarbonates, organic mercaptans, organic mercaptides, organic sulfides, alkali metal sulfides and bisulfides, hydrogen sulfide, and the like. Alkali metal sulfides may also be used as the sulfur compound, for example, including lithium sulfide, sodium sulfide, potassium sulfide, rubidium sulfide, cesium sulfide, and mixtures thereof. Generally, the alkali metal sulfide may be used as a hydrate or as an aqueous mixture. For an aqueous mixture, as discussed below, the alkali metal sulfide can be prepared by the reaction of an alkali metal hydroxide with an alkali metal bisulfide in aqueous solution.

A common alkali metal sulfide that may be used as the sulfur compound in PPS polymerization is sodium sulfide (Na$_2$S), which may be prepared by combining sodium hydrosulfide (NaSH) 22 and sodium hydroxide (NaOH) 24 in an aqueous solution followed by dehydration, generally in a feed dehydration reactor 26. The feedstock produced in this manner may be considered to be an equilibrium between Na$_2$S, water (H$_2$O), NaSH and NaOH according to the following equation.

$$Na_2S + H_2O \rightleftharpoons NaSH + NaOH$$

Furthermore, when the production of Na$_2$S is performed in the presence of the polar organic solvent NMP, a portion of the NMP is converted to sodium N-methyl-4-aminobutanoate (SMAB) by a water-mediated ring opening of NMP by sodium hydroxide.

Consequently, when the sulfur compound is prepared by reacting NaSH 22 with NaOH 24 in the presence of water and NMP 20, the NMP 20 may also react with the NaOH 24 to produce a mixture of sodium hydrosulfide and sodium N-methyl-4-aminobutanoate (SMAB). Stoichiometrically, the overall reaction equilibrium may appear to follow the equation:

$$NMP + Na_2S + H_2O \rightleftharpoons CH_3NH_2CH_2CH_2CH_2CO_2Na(SMAB) + NaSH$$

However, this is a simplification and, in actuality, the equilibrium between Na$_2$S, H$_2$O, NaOH, and NaSH, and the water-mediated ring opening of NMP by sodium hydroxide may be significantly more complex. Accordingly, the reaction above produces a sulfur compound that may be generally labeled as the SMAB/NaSH 14.

2. Polar Organic Compounds (Including Organic Solvents)

Useful polar organic compounds (such as NMP 20) in the production of the PPS polymers are typically those that are solvents for the dihaloaromatic compounds (such as DCB 16) and the sulfur compound (such as SMAB/NaSH 14), and thus those that keep the dihaloaromatic compounds and sulfur compound in solution during the polymerization. In general, examples of such polar organic compounds include amides, including lactams, and sulfones. In particular, the polar organic compounds may include hexamethylphosphoramide, tetramethylurea, N,N'-ethylenedipyrrolidone, N-methyl-2-pyrrolidone (NMP) 20, pyrrolidone, caprolactam, N-ethylcaprolactam, sulfolane, N,N'-dimethylacetamide, 1,3-dimethyl-2-imidazolidinone, low molecular weight polyamides, and the like. The polar organic compound typically used is NMP 20.

3. Other Components (Including Additional Reactants)

Other components (e.g., additives 28) may be employed in the polymerization reaction mixture or during the polymerization. For example, molecular weight modifying or enhancing agents such as alkali metal carboxylates, lithium halides, water, or combinations thereof can be added or produced during polymerization. Alkali metal carboxylates which may be employed include, for example, those having the formula R'CO$_2$M where R' is a hydrocarbyl radical and M is an alkali metal. In an embodiment, the hydrocarbyl radical, R', can be an alkyl, cycloalkyl, or aryl radical or combination thereof such as alkaryl, aralkyl, or the like. In an embodiment, an alkyl radical may be used. In other embodiments, an aryl radical may be used as the hydrocarbyl radical. Hydrocarbyl radicals that are described herein (e.g. under hydrocarbyl radicals for dihaloaryl compounds) may be utilized as the hydrocarbyl radical, R', of an alkali metal carboxylates. In an embodiment the alkali metal may be selected from lithium, sodium, potassium, rubidium and cesium. The alkali metal carboxylate may be employed as a hydrate or as a solution or dispersion in water. A commonly used alkali metal carboxylate in the PPS process is sodium acetate (NaOAc or NaC$_2$H$_3$O$_2$) due to its availability and effectiveness.

Additionally, reactants, such as comonomers, may be included as well. Such comonomers typically include polyhaloaromatic compounds having more than two halogen atoms, such as trichlorobenzene. For example, polyhalo-substituted aromatic compounds having more than two halogen substitutions may be employed as reactants in order to prepare branched, relatively high molecular weight poly(arylene sulfide) polymers. In one embodiment, 1,2,4-trichlorobenzene (TCB) may be used as the polyhalo-substituted compound.

Further, a base 38 may be employed as a reactant, for example, where the sulfur compound employed is an alkali metal bisulfide. If a base is used, alkali metal hydroxides, such as sodium hydroxide (NaOH), may typically be utilized. Additionally, an acidic solution may be added to the reaction mixture prior to termination of the polymerization to reduce the basicity of the reaction mixture. Such a reduction in basicity may lower the amount of ash-causing polymer impurities in the PPS polymer.

B. Conditions of the PPS Polymerization Reaction Mixture

1. Ratio of Reactants

Generally, the ratio of reactants (e.g., DCB 16 and SMAB/NaSH 14) employed in the polymerization process may vary widely. However, the typical molar ratio of dihaloaromatic compound to sulfur compound is generally in the range of about 0.8 to about 2, or from 0.95 to 1.3 in a PPS polymerization reactor. The amount of polyhalo-substituted aromatic compound optionally employed as a reactant may be that amount to achieve the desired degree of branching to give the desired polymer melt flow. Generally, up to about 0.02 moles of polyhalo-substituted aromatic compound per mole of dihaloaromatic compound may be employed. If an alkali metal carboxylate is employed as a molecular weight modifying agent (e.g., as part of the additives 24), the mole ratio of alkali metal carboxylate to dihaloaromatic compounds may be generally within the range of about 0.02 to about 4, more commonly from about 0.1 to 2.

2. Ratio of Polar Organic Compound and Base to the Sulfur Compound

The amount of polar organic compound (NMP 20) employed may also vary during the polymerization over a wide range. However, the molar ratio of polar organic compound to the sulfur compound is typically within the range of about 1 to 10. If a base, such as sodium hydroxide, is contacted with the polymerization reaction mixture, the molar ratio is generally in the range of about 0.5 to about 4 moles per mole of sulfur compound.

3. Reaction Conditions

The components of the reaction mixture may be contacted with each other in any order. Water 30, which may be introduced with the reactants, may be removed prior to polymerization, such as in a dehydration process, especially if a significant amount of water (e.g., more than about 0.3 moles per mole of sulfur compound) is present. Moreover, the temperature at which the polymerization is conducted is generally within the range of about 170° C. (347° F.) to about 450° C. (617° F.), more commonly from about 200° C. to about 285° C. The reaction time may vary widely, depending, in part, on the reaction temperature, but is generally within the range of about 10 minutes to about 3 days, more commonly from about 1 hour to about 8 hours. Typically, the reactor pressure need be only sufficient to maintain the polymerization reaction mixture substantially in the liquid phase. Such pressure will generally be in the range of about 0 psig to about 400 psig, or about 30 psig to 300 psig, or about 100 psig to about 250 psig.

C. Termination of the Polymerization Reaction and Recovery of the PPS

The polymerization may be terminated to begin recovery of the PPS 12 from the reaction mixture by cooling the reaction mixture (removing heat) to a temperature below that at which substantial polymerization takes place. Further, the PPS 12 may precipitate from solution at temperatures less than about 235° C. Depending upon the polymerization features (temperature, solvent(s), and water quantity, among other features) and the methods employed to cool the reaction mixture, the PPS may begin to precipitate from the reaction solution at a temperature ranging from about 235° C. to about 185° C. Generally, PPS precipitation may impede further polymerization. The PPS reaction mixture may be cooled using a variety of methods. For example, solvent may be flash evaporated (e.g., NMP 20, water 30, or a combination thereof) from the PPS reaction mixture. Further, the PPS reaction may be terminated by quenching the reaction mixture and then cooling the reaction mixture. The PPS reaction mixture may be quenched by adding water 30, polar organic compound (NMP 20), or other solvents to the reaction mixture. The cooling of the reaction may also be facilitated by the use of reactor jackets or coils, as discussed herein. The PPS reaction may be terminated in a variety of other methods, such as by contacting the reaction mixture with a polymerization inhibiting compound. It should be clarified that termination of the polymerization does not imply that complete reaction of the polymerization components has occurred. Moreover, termination of the polymerization is not meant to imply that no further polymerization of the reactants can take place. Generally, for economic reasons, termination (and PPS polymer recovery) may be initiated at a time when polymerization is substantially complete or when the increase in polymer molecular weight which would result from further polymerization is not significant.

For recovery of the polymer, the cooling and termination of the reaction brings the PPS polymer solids out of solution, which may then be separated from the reaction mixture by conventional procedures in a resin handling/curing system 32. Such procedures include, for example, filtration of the polymer followed by washing with water 30, or dilution of the reaction mixture with water followed by filtration and water washing of the polymer. In general, the polymers may be recovered by the "flash" process, by employing a separation agent, by mechanical separation (e.g., shaker screen), and so forth.

D. PPS Curing and Applications

Further, the PPS may be cured in the resin handling/curing system 32 through an oxidative heat treatment, for example, by heating at temperatures above about 150° C. in the presence of a gas containing oxygen. Agents that affect curing, such as peroxides, accelerants, and/or inhibitors, may be compounded with the PPS 12. Such cured polymer generally has high thermal stability and good chemical resistance, and is useful, for example, in the production of coatings, films, and molded objects. Additionally, the PPS 12 may ultimately be blended in a compounding/processing system 34 with various additives, such as polymers, fiber reinforcements, fillers, pigments, nucleating agents, antioxidants, UV stabilizers, heat stabilizers, carbon black, lubricants, plasticizers, corrosion inhibitors, mold release agents, pigments, titanium dioxide, clay, mica, processing aids, adhesives, tackifiers, and the like.

Ultimately, the PPS 12 may be formed or molded into a variety of components or products for a diverse range of applications and industries, as indicated in block 36. For example, applications may include automotive, aerospace, solar panel, and electronic/electrical parts which may need polymers that have conductivity, high strength, and high modulus, among other properties. Such components and products may be further processed, assembled, shipped, etc. prior to receipt by an end-user.

E. Washing

In the illustrated embodiment of FIG. 1, to reduce off-gassing during subsequent melt processing of the PPS 12, a base 38 (e.g., a 32 weight percent solution of sodium hydroxide or caustic in water) may be added to the polymerization reactor 18 or to the water 30 stream entering the reactor 18. The base 38 may be added to the reactor 18 (or to the water 30 stream) before or after termination of the PPS polymerization in the reactor 16. In addition, the base 38 may be added to the PPS 12 in the resin handling/curing system 32. The base 38 may be employed in an independent wash of the PPS 12 or added to an existing wash (e.g., water wash) of the PPS 12. This is discussed further with respect to FIGS. 3 and 4, below.

F. PPS Polymerization Reactor

Figure 2:
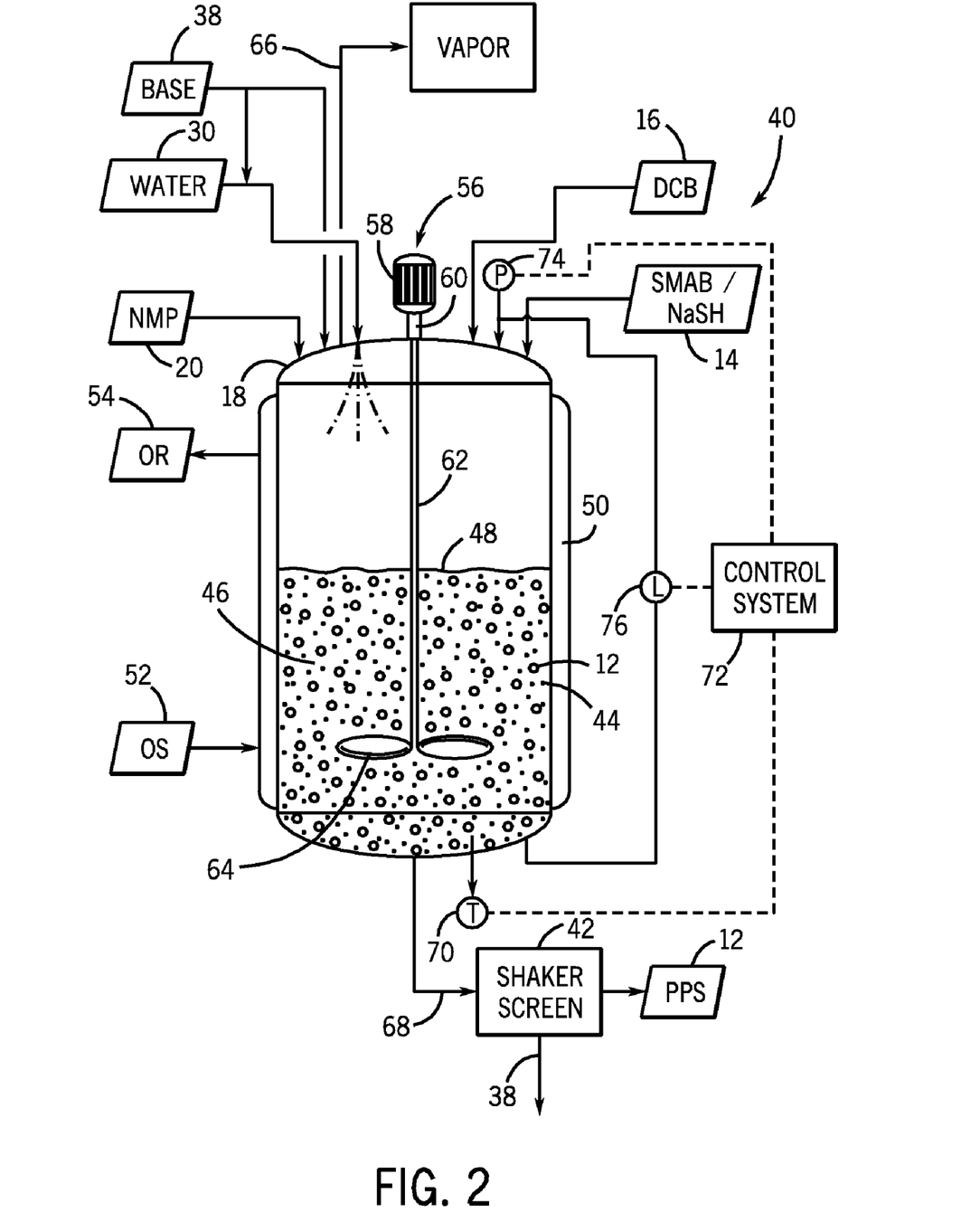
FIG. 2 is a diagrammatical representation of the polymerization reactor depicted in FIG. 1 in accordance with embodiments of the present techniques.

FIG. 2 illustrates a diagrammatical representation of an exemplary polymerization reactor area 40, after the polymerization reactor 18 has been cooled, which has precipitated one or more solids in this embodiment. The figure also illustrates a shaker screen 42 for separating PPS 12 from undesirable solids 44 from the reaction mixture. The liquid level of the mixture 46 in the reactor 18 is designated by reference numeral 48. Depending upon the composition of the reaction mixture 46 (e.g., the concentration of water, the concentration and identity of the polar organic solvent(s), and the presence or absence of promoters, among others) and the temperature, the mixture 46 may include one or more phases. The one or more phases may include, for example, two liquid phases and precipitated salt and/or precipitated PPS, such as low and high molecular weight PPS. In other embodiments, only a single phase may be present.

Normally, the polymerization is exothermic, and thus means for removing heat may be required. In the illustrated embodiment, a reactor jacket 50 removes heat from the reactor contents (e.g., reactor mixture 46). Cooling coils within the reactor may also be employed to remove heat from the reactor mixture 46. A variety of cooling mediums, such as oil and other heat transfer fluids, may be supplied to the reactor jacket 50 and/or internal cooling coils. In this example, the cooling medium is oil, with the oil supply (OS) designated by reference numeral 52, and the oil return (OR) designated by reference numeral 54. An agitator 56 may also be employed to facilitate heat transfer, to promote contact of the reactants, and to keep multiple phases (e.g. two liquid phases, or two liquid phases and a solid phase) well-dispersed in reactor mixture 40. The agitator 56 may include a motor 58, a drive 60, a shaft 62, an impeller 64, and the like. The agitator 56 may also employ a seal, such as a single or a double mechanical seal. A variety of agitator 56 (or stirrer) configurations may be implemented.

The water 30 that may be used for quenching and other functions may be introduced at the top of the reactor 18, as illustrated in FIG. 2. The various feeds, such as the NMP 20, DCB 16, and SMAB/NaSH 14, and other reagents and additives (e.g. property modifiers, molecular weight control agents, among others) may be introduced through openings in the top head of the reactor 18. However, the feed entry points may be configured on any suitable part of the reactor 18. Furthermore, while each reagent is shown to have a separate inlet on the reactor, various reagents may be combined to use the same inlet. Moreover, flow equipment, such as control valves and internal devices (e.g., nozzles, sprayers, spargers, dip tubes), and so forth, may be employed.

The reactor 18 may also contain an outlet 66 so that water 30 or polar organic solvent (e.g. NMP 20) may be vented from the reactor to cool the reaction mixture, terminate the PPS reaction, and/or precipitate the PPS 12. The reactor 18 may also have an outlet 68 through which the reaction mixture can be passed to cool the reaction mixture 46 (by passing it to a lower pressure vessel) and/or begin the process to isolate the PPS 12.

To measure process variables, a variety of instruments may be provided. For example, a temperature element 70, such as a thermocouple or resistance temperature detector (RTD), may be inserted directly into the reactor 18 or into a thermowell disposed in the reactor 18. Temperature indication may be accomplished, for example, with a local gauge coupled to the temperature element 70. In addition or in lieu of a gauge, a temperature transmitter coupled to the temperature element 70 may transmit a temperature signal to a processor or control system 72, such as a distributed control system (DCS) or a programmable logic controller (PLC), where the temperature value may be read by an operator and/or used as an input in a variety of control functions. For example, as discussed below, the temperature indication may be used in the control of the flow rate and/or temperature of the cooling medium (e.g., heat transfer fluid) through the reactor jacket 50 and/or cooling coils to control the reactor temperature.

Further, a pressure element 74, such as a diaphragm or Bourdon tube, may be installed on the reactor 18 to measure pressure. A local gauge may couple to the element 74 to indicate the measured pressure. In addition or in lieu of a gauge, a pressure transmitter coupled to the pressure element 74 may transmit a pressure signal to the control system 72. Thus, as with temperature indication, the indication of reactor 18 pressure may be read locally or remotely by an operator, and used in a variety of control functions via the control system 72.

Additionally, the reactor level 48 may be measured by a level element 76, such as the differential pressure meter represented in the illustrated embodiment. Other exemplary level elements may include a variety of sensors, such as capacitance or inductance probes inserted into the reactor. As with reactor 18 pressure and temperature, local or remote level indication may be employed. The indicated level may be used as input for various control purposes via the control system 72.

A variety of other instrumentation and controls may be employed around and on the reactor 18. For example, the flow rate of cooling medium through the reactor jacket 50 and/or coils may be measured with a flow orifice or mass flow meter disposed on the inlet and/or outlet conduits. The flow rate of cooling medium may be full-open or controlled (automatically or manually) via the control system 72 and/or appropriate valve configurations. The desired flow rate may be set to a substantially constant mass or volumetric flow rate, or may be varied to control temperature of the oil return 54 and/or the temperature of the reactor 18, for example.

Further, the metering of the reactor 18 feeds (e.g. water 30, NMP 20, SMAB/NaSH 14, or DCB 16 feeds) are also typically measured and controlled. Such flow measurement may be accomplished, for example, with a flow totalizer (including mechanical control), or with a mass flow meter or flow orifice (e.g., using differential pressure). Moreover, the flow indication may be based on change in the reactor level 48, and so on. The reactor 18 feeds may be controlled locally or remotely, automatic or manually, and with manual valves or automatic control valves, for example. In general, a control system 72 and other processor-based systems may control a range of operations in the PPS manufacturing system 40. The control system 72 may be configured with the appropriate hardware and software (e.g., code).

IV. Base Washing of the PPS Polymer

Figure 3:
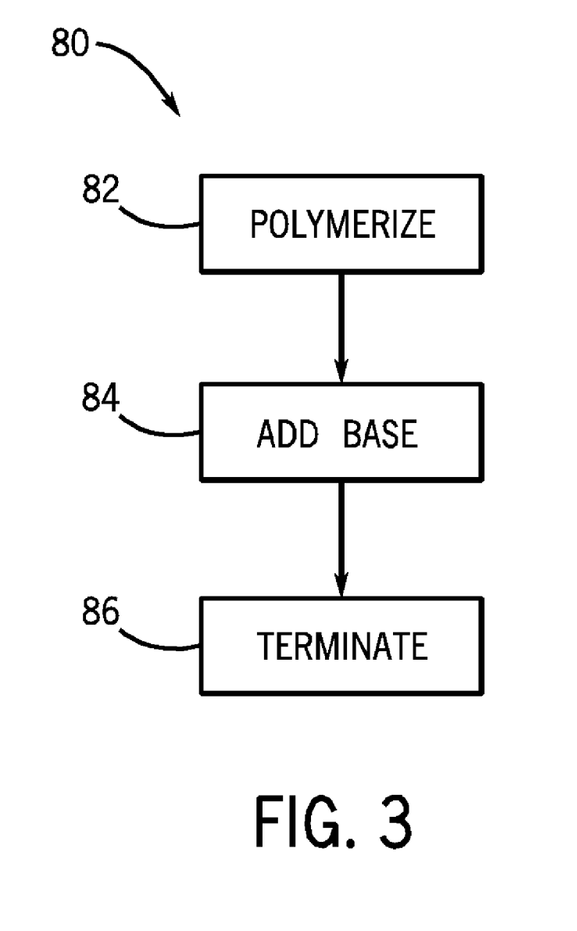
FIG. 3 is a block diagram of an embodiment of a method for reducing off-gassing of PPS in accordance with embodiments of the present techniques.
Figure 4:
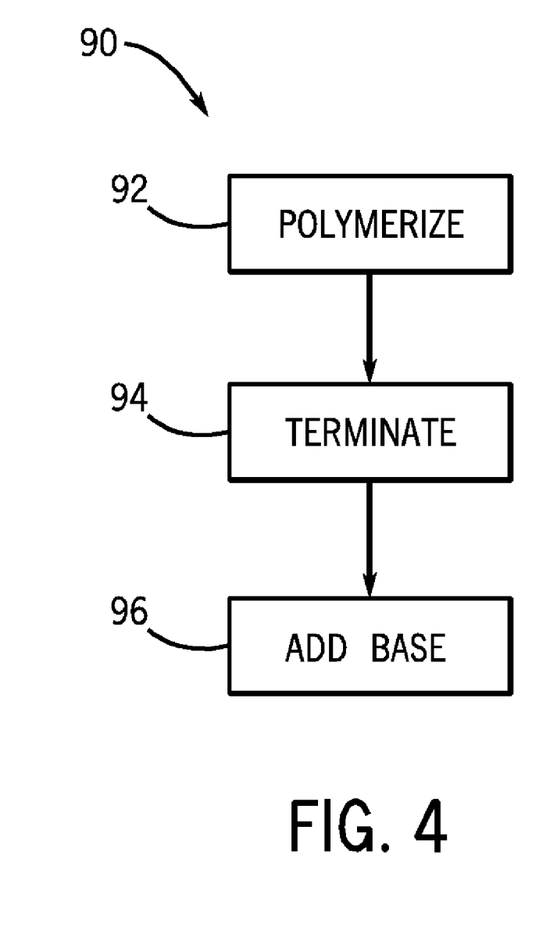
FIG. 4 is a block diagram of an embodiment of a method for reducing off-gassing of PPS in accordance with embodiments of the present techniques.

Referring to FIGS. 3 and 4, two exemplary general methods 80 and 90, respectively, for washing the PPS polymer with a base (e.g., sodium hydroxide) to reduce subsequent off-gassing of the PPS polymer are depicted. In FIG. 3, the PPS polymer (which may be in solution in the polymerization mixture) is washed with the base in the PPS polymerization reactor prior to termination of the PPS polymerization. In FIG. 4, the PPS polymer is washed with the base after termination of the PPS polymerization. The base washing of the polymer after termination may occur in the reactor or downstream of the reactor. As discussed, base washing of the PPS polymer before or after polymerization may facilitate extraction of oligomers and other off-gassing compounds from the PPS polymer.

In the process 80 depicted in FIG. 3, the reactants and solvent are added to the PPS reactor, and the reactants polymerized, as indicated by reference numeral 82 and as discussed with regard to FIGS. 1 and 2. During polymerization, a base is added to the reactor, as indicated by reference numeral 84. An amount of base added may be decided by the desired increase in pH of the polymerization mixture, the desired ratio of base to PPS polymer, and the like. Following addition of the base the temperature in the reactor may be adjusted to modify the polymerization conditions. For example, the temperature may be lowered to lessen the reaction of the caustic with the end groups of the polymer and thus lower the amount of termination of the chlorinated end groups to form OH or $O^-Na^+$ groups. The lower temperature may also decrease polymerization of polymer. Further, the amount of time the added solution is in contact with the base may be adjusted to lower the reaction of the chlorinated end-groups with the caustic. After addition of the base, the PPS polymerization may be terminated, as indicated by reference numeral 86. The termination, for example, may occur via either the flash process or quench process, as discussed herein.

In the process 90 depicted in FIG. 4, the reactants and solvent are added to the PPS reactor, as indicated by reference numeral 92 and as discussed with regard to FIG. 3. The PPS polymerization is terminated, as indicated by reference numeral 94 as discussed with regard to FIG. 3. Generally, the caustic may be added as part of the quench process to terminate the reactor. However, in the method 90 of FIG. 4, the base is not added until after termination, as indicated by reference numeral 96. Again, the base may be added in the reactor or downstream of the reactor. The amount of base added may be decided by the desired increase in pH of the PPS polymer slurry, the desired ratio of base to PPS polymer, and the like. Moreover, as mentioned, the base may be added to an existing wash (e.g., water wash) of the PPS polymer. It should be noted that the methods 80 and 90 may be combined, such that base is added (to reduce off-gassing) both before and after termination of the polymerization.

To summarize, in embodiments a system to produce PPS polymer may include a polymerization system having a vessel to react a sulfur source and a dihaloaromatic compound in the presence of a polar organic compound. A wash system may be configured to wash the PPS polymer with a base (e.g., sodium hydroxide) or a solvent to lower the oligomer content of the PPS polymer. The wash system may wash the PPS polymer in the polymerization reactor and/or downstream of the reactor. A handling system to receive the PPS polymer from the polymerization reactor, and the handling system may incorporate the wash system. The polymerization system may be configured for a flash termination process.

IV. Example of Washing of PPS Polymer

Test Procedures

As discussed herein, a quartz crystal microbalance was used to determine a relative amount for off-gassing of a sample by measuring the decrease in the vibrational frequency of a quart crystal as material plated out on the crystal. The test operates by vaporizing volatile material from a solid PPS sample and condensing the vapor on a water cooled, vibrating quartz crystal. A relative value for the amount of condensed material was estimated by the decrease in frequency of the vibrating crystal. This value was used in comparison to values obtained for other samples, e.g., base washed versus unwashed, and cured versus uncured, as discussed below.

To measure a value for QCM, a weighed sample of the PPS polymer (about 16 milligrams) was placed in the bottom of a heated (290° C.) stainless steel beaker that was covered with a lid containing the vibrating crystal and connections to the cooling system for the crystal. As off-gassing vapors condensed on the crystal, the resonance frequency of the crystal decreased in proportion to the amount deposited. Test values were reported in terms of a dimensionless relative number proportional to the change in frequency of the crystal over a 30 minute test time. Lower reported values indicate that the test sample had a lower level of volatiles at the test temperature than samples with higher QCM values.

The extrusion rate (ER) results for polyphenylene sulfide (PPS) were generally measured by the method of ASTM D 1238-86, Procedure B-Automatically Timed Flow Rate Procedure, Condition 316/5.0. Three melt index type measurements were used, wherein each of the procedures were created by modifying various conditions of ASTM D 1238-86. The three procedures were Extrusion Rate (ER), 1270ER and Melt Flow (MF). For all three techniques, the orifice diameter was 0.0825+/−0.002 inches and the temperature used was 316° C. All three techniques used a 5 minute pre-heat time prior to the measurement. For the ER measurement, the orifice length was modified to 1.25 inch in length and used a total drive weight, including the piston, of 345 grams. The values for ER are expressed as grams per ten minutes (g/10 min). For the 1270ER measurement, the orifice size was modified to 1.25 inch in length and using a total drive weight, including the piston, of 1270 grams. The values for 1270ER are expressed as grams per ten minutes (g/10 min). For the MF measurement, the orifice size was modified to 0.315 inch in length and using a total drive weight, including the piston, of 5000 grams. The values for MF are expressed as grams per ten minutes (g/10 min). Generally, MF may be used for uncured or annealed samples. The flow rate of Cured samples (termed melt flow or MF) may be measured using the ASTM D 1238-86, procedure B with no modifications to the conditions. The MF measurement uses a total drive weight, including the piston, of 5000 g, a temperature of 600° F., and an orifice size of 0.315 inches in length.

The ash content of the polymers was measured by burning a weighed polymer sample (e.g., about 1 gram) in a furnace under an air atmosphere until no further polymer remains. The remaining material was then weighed, and the ash content was calculated as the ratio of the weight of the ash remaining after burning divided by the weight of the initial polymer sample.

Various samples of PPS were also cured after the washing procedures, prior to being testing for off-gassing by QCM. Curing was performed by loading the PPS into a heated mixing vessel in the solid state. The vessel and contents were then heated to a temperature in the range of about 350° F. to about 490° F. for a variable length of time (e.g., 5 min., 10 min., 20 min., 60 min., or longer) in an atmosphere containing oxygen (e.g., air). Sampling of the material was performed until the PPS reached a target MF (e.g., about 20 to about 50). The PPS is then cooled and transferred from the vessel to yield the cured resin.

The off-gassing and ash content of the PPS were also measured by Thermo-Gravimetric Analysis (TGA). TGA was run by placing a 250 mg sample of the resin in a small aluminum pan, then placing the pan and sample in a TGA analyzer. The samples were then heated to either 315° C.

(600° F.) or 350° C. (662° F.) at 5° C./minute, followed by holding the sample at the final temperature for 20 minutes. All of the samples lost some weight at temperatures of less than about 100° C., which may have been due to loss of adsorbed water.

Base Washing

The base treatment of the PPS may result in a PPS which has reduced off-gassing during subsequent processing to form molded or extruded products. As discussed herein, the reduction in off-gassing may be determined using a quartz-crystal microbalance (QCM). In one example, commercial PPS resin samples were based washed in a pilot plant and the effects of the washing procedure on off-gassing (e.g., volatiles) were measured by a QCM.

As previously mentioned, QCM places a PPS sample in close proximity to a vibrating quartz crystal. As the sample is heated, material may be released from the sample (e.g., by off-gassing) and may subsequently be plated out on the quartz crystal. The plating of the material increases the weight of the quartz crystal and, thus, lowers the vibrational frequency. The change in the vibrational frequency may be used to obtain a relative measurement of the amount of material plating out on the quartz crystal while the PPS sample is heated to a specified temperature for a specified time. The results for off-gassing may change depending on whether the PPS is cured or annealed. Accordingly, the comparisons presented below are relevant only to samples processed using the same conditions. It should be noted that the QCM measurement gives a measure of material that has off-gassed and is large enough in molecular weight to condense on the crystal. It therefore yields information concerning the amount of material that off-gassing and will create residue on processing equipment, rather than material that will simply vent off. This measurement is similar but not equivalent to a thermogravemetric analysis (TGA) weight loss (discussed later). In the case of TGA weight loss, the amount of material that evolves is detected and it is not discerned whether is is condensable or non-condensable.

Three commercial PPS grades were used in the tests discussed below: PR23, PR32, and PR26. PR23 and PR32 are manufactured by Chevron Phillips Chemical Company LP, are flash recovered, cured, and unmodified resins. The last grade, PR26, is also available from Chevron Phillips Chemical Co., but is in a pre-finished state. More specifically, the resin was collected prior to washing the salt from the PPS in order to mimic processing conditions at the time of the base addition. Accordingly, PR26 is referred to as a "salt-filled" resin. Results for base washing of the salt filled PR26 are discussed with respect to Table 6, below.

An overview of the gains that the present techniques may provide is indicated by the values presented in Table 1, which provides results of the base washes and comparative washes for a commercial PPS, grade PR32. Provided are QCM values for a non-washed sample (item 1), a sample subjected to a NaOH wash at 350° F. (item 2), a sample subjected to a NaOH wash at 350° F. followed by an acid wash at 350° F. (item 3), and a sample subjected to two water washes at 350° F. (item 4). In this example, about a 58% reduction in the mass of material that may off-gas during the subsequent melt processing may be estimated for caustic washing the PPS (based on a reduction in QCM from 3.89 to 1.64).

The general procedure used for base washing of the resin started with the addition of 115 gallons of deionized water to a tank, followed by addition of the desired amount of a 50% solution of NaOH. To this 100 lbs of PPS were added and mixed for 15 minutes. The mixture was then be heated to 350° F. and held for 10 minutes. The mixture was cooled and recovered using belt filtration. Additional washing as described in Table 1 was performed in a similar manner.

An extrusion rate (ER) for each of the samples is also provided in Table 1. The ER is a modified melt flow rate, measured using the procedures discussed above. The ER results tend to decrease for washed resins, which may indicate increased curing ability. Further, this may also indicate that a fewer number of terminating groups are present after the caustic wash.

TABLE 1

Effects of Caustic/Acid Washing of Commercial Resin PR32, without curing.

| No. | Wash Conditions | Slurry pH | ER | QCM (Ave. of 2) |
|---|---|---|---|---|
| A | None - As Received | NA | 65.1 | 3.89 |
| B | 350° F. NaOH Wash | 11.2 | 45.6 | 1.64 |
| C | 350° F. NaOH Wash/350° F. Acid Wash | 5.0 | 77.9 | 1.92 |
| D | After Two 350° F. Water Washes | 7.6 | 79.8 | 2.34 |

It should be noted that the present techniques may be employed in conjunction with traditional approaches of reducing off-gas. Such traditional approaches have included, for example, utilizing a quench process (instead of a flash process) for terminating the PPS polymerization. It is believed that the quench fluid (e.g., water or the polar organic compound) used to quench the reaction may also wash or extract oligomers from the PPS. In general, quench recovered resins are lower off-gassing materials. Indeed, relatively higher levels of off-gassing may be experience with PPS resins recovered via the flash process mentioned above. The present techniques provide for obtaining a low off-gassing flash recovered resin which may broaden the market for flash recovered PPS. QCM was used as a relative measurement to determine the efficacy of the base wash procedure. For example, utilizing base washing, QCM values by at least 20%, 30%, or 40%. Alternatively, base washing reduced the QCM values from about 20% to about 80%, from about 30% to about 75%, from about 40% to about 65%.

Another approach that may reduce off-gassing is curing the PPS resin prior to melt processing. It is believed that PPS curing reduces subsequent off-gassing via devolatization. To determine if base washing further decreased the off-gassing over curing alone, various samples were also tested after they had been cured, following the procedures discussed above. Samples that were cured before off-gassing tests were run are indicated by a "C" after the sample number in Tables 2-5, discussed below.

The results for exemplary washing of samples of PPS polymer under various experimental conditions are tabulated in Tables 2-6. Three different grades (labeled PR23, PR32, and PR26) of PPS polymer obtained from Chevron Phillips Chemical Company LP were used. Washes of the PPS polymer samples with sodium hydroxide and treated water (obtained via membrane or reverse osmosis processing) at given temperatures and lengths of time are compared. Table 2 provides values for QCM after different wash conditions, both for uncured and cured samples. Further, it should be noted that the wash procedures indicated for a particular item number in Table 2 are the same throughout tables 3-5. Table 3 provides the amount of weight lost of the polymer samples after washing, as determined by thermo-gravimetric analysis (TGA). Table 4 tabulates other properties that may be affected by curing, such as extrusion rate, cure rate, and ash content. Table 5 tabulates the properties of the cured resins after base washing.

TABLE 2

QCM Results Comparisons for Washed and Unwashed PPS

| No. | Cured. | Base Resin | Wash Treatment | QCM |
|---|---|---|---|---|
| 1 | NO | PR23 | None | 2.5 |
| 1C | YES | PR23 | None | 1.2 |
| 2 | NO | PR23 | 350° F. Water | 1.7 |
| 2C | YES | PR23 | 350° F. Water | 0.9 |
| 3 | NO | PR23 | 350° F. NaOH | 1.5 |
| 3C | YES | PR23 | 350° F. NaOH | 0.8 |
| 4 | NO | PR32 | None | 3.9 |
| 5 | NO | PR32 | 350° F. NaOH + 350° F. Water | 1.9 |
| 6 | NO | PR32 | 350° F. Water (twice) | 2.4 |
| 7 | NO | PR32 | 350° F. Water | 2.3 |
| 7C | YES | PR32 | 350° F. Water | 1.3 |
| 8 | NO | PR32 | 350° F. NaOH | 1.7 |
| 8C | YES | PR32 | 350° F. NaOH | 1.4 |

As indicated in Table 2, a high temperature wash with a base (e.g., NaOH) may reduce the amount of material released in off-gassing during subsequent processing. This may be seen by the comparison between the QCM values for item 1 and item 4, which shows a decrease from 2.5 to 1.5. A further indication may be seen in the comparisons of the QCM values for item 1C with item 3 C, and item 4 with item 8, all of which show a consistent decrease in QCM after a caustic wash. For example, utilizing base washing, QCM values of a cured PPS were reduced by at least 15%, 20%, or 25%. Alternatively, base washing reduced the QCM values of a cured PPS from about 15% to about 60%, from about 20% to about 50%, from about 25% to about 45%.

The data in Table 2 also indicates that a decrease in off-gassing may be accomplished by curing the PPS. For example, the comparison of QCM values for item 1 (uncured) with item 1C (cured) show a drop from a QCM of 2.5 to 1.2. A similar drop is seen in the comparison of item 2 with item 2 C (1.7 to 0.9) and item 3 with item 3 C (1.5 to 0.8), among others. Thus, a further drop may be accomplished by both curing the PPS and washing the PPS with caustic, as shown by the comparison in the QCM value of item 1C (1.2) with item 3C (0.8).

QCM is only one of a number of possible techniques that may be used to measure off-gassing from the PPS samples. For example, samples were also tested by heating in a thermogravimetric analyzer (TGA), which continuously measures the weight of a sample during the testing. As discussed, TGA generally measures the total gas that evolved, and does not discern whether the evolved gas is condensable and might cause plate out issues on equipment rather than simple venting off. While the TGA will not necessarily match the QCM exactly (for the reasons given—different phenomena being measured), it should yield a similar trend in most cases. Table 3 provides the percentage of weight lost by the polymer samples after heating for the indicated period of time. The samples in Table 3 were treated by the procedure corresponding to the same item no. in Table 2, e.g., item 2 and 2C were washed with water at 350° F., while items 3 and 3C were base washed at 350° F. In all cases, the weight losses in the TGA results were adjusted to have the same weight loss at 100° C. to compensate for loss of weight of the water up to that point.

Tables 2 and 3 indicate reduced off-gassing due to additional high temperature washing. This is evident from the decreased QCM values for based washed samples, presented in Table 2, and the decreased weight-loss values as measured by TGA in Table 3, both of which are believed to correlate to a reduction in off-gassing of the PPS polymer during subsequent processing. For example, the reduction in weight loss during thermal degradation after washing may be an indication of the amount of oligomers and other low-molecular weight components extracted from the PPS polymer.

TABLE 3

Percent Weight Loss measured by TGA.

| No. | Base Resin | Ramp to 315° C. (%) | Hold (20 Min) 315° C. (%) | Ramp to 350° C. (%) | Hold (20 Min) 350° C. (%) |
|---|---|---|---|---|---|
| 1C | PR23 | 0.3 | 0.6 | 0.6 | 1.1 |
| 2C | PR23 | 0.3 | 0.5 | 0.4 | 0.8 |
| 3C | PR23 | 0.2 | 0.4 | 0.5 | 0.9 |
| 1 | PR23 | 0.5 | 1.0 | 0.8 | 1.5 |
| 2 | PR23 | 0.4 | 0.7 | 0.6 | 1.3 |
| 3 | PR23 | 0.3 | 0.6 | 0.5 | 1.2 |
| 4 | PR32 | 1.1 | 1.4 | 1.4 | 1.9 |
| 5 | PR32 | 0.3 | 0.5 | 0.4 | 0.8 |
| 6 | PR32 | 0.6 | 0.9 | 0.8 | 1.3 |
| 7C | PR32 | 0.3 | 0.6 | N/A | N/A |
| 8C | PR32 | 0.4 | 0.8 | N/A | N/A |

Tables 4 and 5 provide values for other properties for the uncured and cured samples of Table 2. In Table 4, the values presented for ER may show the effects that washing has on the viscosity of the sample. More specifically, the comparison between the ER of item 1 (unwashed) and item 3 (caustic washed) indicates that the caustic wash has lowered the ER of PR23, which may correlate to the removal of low molecular weight PPS oligomers. The same effect may be seen for PR32, as indicated by the comparison of item 4 and item 8 in Table 4. Further, the data indicates that the cure rate may be accelerated by washing with NaOH, as shown by the comparison between item 1 and item 3 in Table 4. Without intending to be limiting, it is believed that these effects may be caused by modifications of the end group on the individual polymer chains.

TABLE 4

Properties of Uncured Samples after Caustic Wash.

| No. | Base Resin | Extrusion Rate (ER) | Cure Rate 6 Hrs @ 515° F. | Ash (%) |
|---|---|---|---|---|
| 1 | PR23 | 56.4 | 24.5 | 0.97 |
| 2 | PR23 | 63.4 | 12.7 | 0.58 |
| 3 | PR23 | 42.8 | 35.8 | 0.90 |
| 7 | PR32 | 57.1 | 8.6 | 0.76 |
| 8 | PR32 | 36.2 | 22.8 | 1.01 |

The data presented in Table 5 indicate that after caustic washing the PPS may still be cured to general target values for flow properties after caustic washing, indicating the polymer was not fundamentally affected by the washing process. Specifically, cured PPS may be targeted at a 1270 ER rate of between about 30 and 40.

Figure 5:
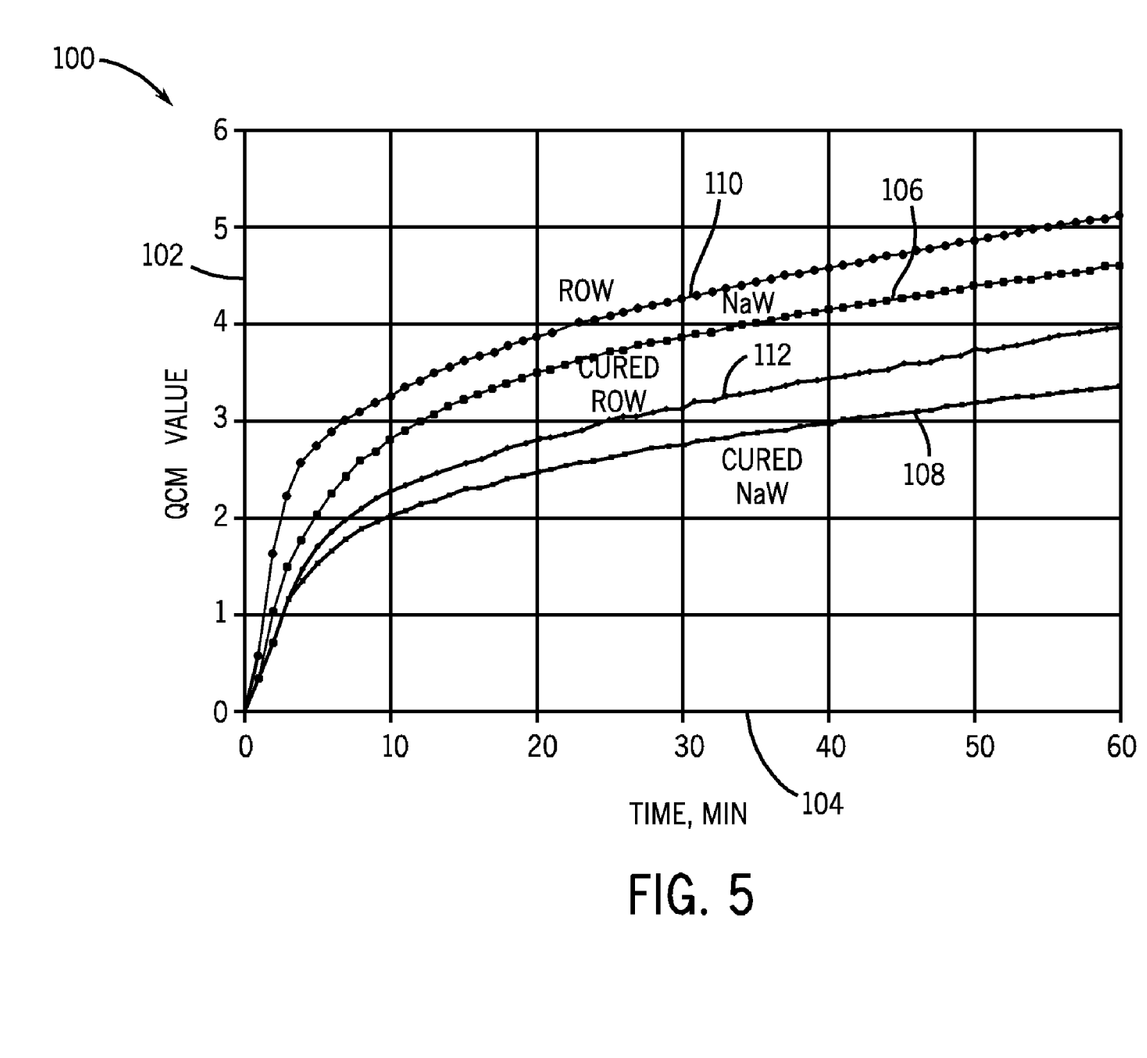
FIG. 5 is a plot depicting an indicator of off-gassing of PPS versus the time of exemplary washes of the PPS in accordance with one embodiment of the present techniques.

FIG. 5 depicts a plot 100 of QCM 102 versus time 104 (in minutes) of caustic and water washes of a commercial sample (grade PR32) of PPS polymer. The QCM measurement presented in FIG. 5 was performed as described herein. Material continued to add to the crystal as it was evolved from the polymer. The values presented in the Tables were measured at 5 minutes into the test. The first 1 minute is considered an equalization period, then 5 minutes following this initial 1 minute the values are taken.

TABLE 5

Curing Properties for Samples After Caustic Washing

| No. | Base Resin | Max Bed T (° F.) | Cure Time (Hrs) | 1270 ER |
|---|---|---|---|---|
| 1C | PR23 | 377 | 13.0 | 35.7 |
| 2C | PR23 | 390 | 25.1 | 37.3 |
| 3C | PR23 | 380 | 10.8 | 36.8 |
| 7C | PR32 | 390 | 7.3 | 34.0 |
| 8C | PR32 | 395 | 9.42 | 40.5 |

In FIG. 5, the QCM values over a longer period of time are given as an example for the particular PPS samples described. As discussed, QCM is an indicator of the amount of off-gassing the PPS polymer will experience during melt processing. The higher the QCM value, the more off-gassing that may occur. Curves 106 and 108 are QCM 102 values for caustic washing (sodium hydroxide) of un-cured and cured samples of PPS polymer, respectively. Curves 110 and 112 are QCM values 102 for water washing of un-cured and cured sample of the PPS polymer, respectively. As can be seen by the plot 90, a reduction in the QCM of the polymer samples is experienced due to caustic washing as compared to water washing of both un-cured and cured PPS polymer. Moreover, as expected, the cured PPS polymer has a lower QCM than un-cured PPS polymer.

Base Washing a Salt Filled PPS Grade

In tests conducted on a salt filled grade, prior to completion of the production (e.g., PR26), similar reductions were obtained for base washing as for the finished grades (e.g., PR23 and PR32). The results are provided in Table 6.

TABLE 6

Results for Base Washing Salt Filled Grade (PR26)

| No. | Experiment | Treatment Before Water Wash | Yield (g) | 1270 ER | QCM | Cured MF |
|---|---|---|---|---|---|---|
| 1 | Control | — | 94.6 | 32.7 | 1.51 | 50.2 |
| 2 | | 150° F. NaOH | 96.4 | 20.0 | 2.03 | 26.7 |
| 3 | | 350° F. NaOH | 94.3 | 24.1 | 1.35 | 41.7 |
| 4 | solvent 1 | IPA (ambient) | 92.9 | 32.0 | 0.88 | 39.8 |
| 5 | solvent 2 | NMP (122° F.) | 92.5 | 25.3 | 0.42 | 30.9 |

Generally, similar results were seen for washing the salt filled PPS as for washing the final polymer grades. The QCM may show a reduction for the 350° F. NaOH wash over the unwashed control. Further, washing with solvents, such as isopropyl alcohol (IPA) or NMP shows a further decrease in QCM over the control sample and thus an implied decrease in the off-gassing.

Washing PPS with NMP

Washing PPS with NMP after polymerization may lower off-gassing from PPS during subsequent processing. In a series of tests, NMP washing was tested on three lots of a commercially available PPS, PR23 (obtained from Chevron Phillips Chemical Co.), at temperatures between about ambient and 300° F. The washes were generally run by mixing a slurry of NMP and PPS, filtering the PPS from the slurry, and then water washing prior to a final filtration. The results for the tests of NMP washing are presented in Table 7, below.

TABLE 7

QCM results for NMP washing of three lots of PR23[1]

| No. | Wash Temp ° F. | Lot | Cure Rate[2] | Ash | ER | QCM | Special Treatment |
|---|---|---|---|---|---|---|---|
| 1 | — | 1 | 122 | 0.97 | 56.4 | 2.5 | As Received (control) |
| 2 | 72 | 1 | 87.7 | 0.76 | 55.8 | 1.9 | |
| 3 | 100 | 1 | — | — | 55.0 | 1.0 | |
| 4 | 120 | 1 | — | — | 54.6 | 0.3 | |
| 5 | 140 | 1 | 87.3 | 0.52 | 58.8 | 0.4 | |
| 6 | 160 | 1 | 93.3 | 0.46 | 57.2 | 0.4 | |
| 7 | 200 | 1 | 91.5 | 0.45 | 56.0 | 0.3 | |
| 8 | 250 | 1 | 106 | 0.41 | 57.6 | 0.2 | |
| 9 | 300 | 1 | 102 | 0.34 | 57.0 | 0.3 | |
| 10 | 100 | 1 | — | — | 69.0 | 0.9 | PPS Compacted |
| 11 | 120 | 1 | — | — | 70.8 | 0.5 | PPS Compacted |
| 12 | 300 | 1 | 105 | 0.33 | 70.0 | 0.3 | PPS Compacted |
| 13 | — | 2 | — | — | 40.7 | 2.9 | As Received (control) |
| 14 | 140 | 2 | — | — | 42.7 | 0.4 | |
| 15 | 250 | 2 | — | — | 45.1 | 0.2 | |
| 16 | — | 3 | — | — | 36.6 | 2.4 | As Received (control) |
| 17 | 140 | 3 | — | — | 38.8 | 0.3 | |

[1]Commercially available from Chevron Phillips Chemical Co.
[2]Measured for 2 hours at 515° F.

As in the previous tests, QCM was used as a relative measurement to determine the efficacy of the wash procedure. For example, QCM values were reduced by about 80-85% by simply pouring NMP at 140° F. through a bed of the PPS without any mixing. In other tests, the QCM values were reduced by about 90% when slurries of PPS and NMP were mixed at temperature ranges between about 120 to 300° F. Further tests showed that the QCM values could be reduced by 60% at 100° F., and even by 25% using an ambient temperature wash.

Generally, there may be a relationship between the temperature of the wash used and the resulting ash value obtained for the polymer. Higher temperatures may result in lower ash content as contaminants are removed from the polymer. Lastly, an extrusion rate (ER), which is a modified melt flow rate, is also provided. The ER results indicate that the viscosity of the PPS resin has also been affected by the washing process.

Generally, the results discussed above indicate that a high temperature caustic (e.g., NaOH) wash may reduce the amount of off-gassing seen during heating of a PPS. This may correlate to a reduction in the amount of off-gassing seen during subsequent processing, e.g., injection molding, pipe extrusion, sheet extrusion and forming, and the like. The use of a solvent wash (e.g., NMP, IPA, and the like) may also provide a significant reduction in off-gassing. Curing may also lower the amount of off-gassing, and, in concert with a solvent or caustic wash, may provide further benefits.

While the present techniques may be susceptible to various modifications and alternative forms, specific embodiments have been shown by way of example in the drawings and will be described in detail herein. However, it should be understood that the present techniques are not intended to be limited to the particular forms disclosed. Rather, the present techniques cover all modifications, equivalents and alternatives falling within the spirit and scope of the invention as defined by the following appended claims.

What is claimed is:

1. A method of producing polyphenylene sulfide (PPS) polymer, comprising:
    reacting a sulfur source and a dihaloaromatic compound in the presence of a polar organic compound in a polymerization mixture in a polymerization vessel to form a PPS polymer;

flash evaporating at least a portion of the polar organic compound from the polymerization mixture to terminate the reaction of the sulfur source and the dihaloaromatic compound; and washing the PPS polymer with a base or a solvent comprising n-methyl pyrrolidone (NMP), wherein washing lowers off-gassing of the PPS polymer.

2. The method as recited in claim 1, wherein the base is added to the flash evaporated polymerization mixture and raises the pH of the flash evaporated polymerization mixture to at least 10.

3. The method as recited in claim 1, wherein washing the PPS polymer comprises adding the base to a water wash of the PPS polymer to increase a pH of the water wash to at least about 10.

4. The method as recited in claim 1, wherein the base comprises sodium hydroxide.

5. The method as recited in claim 1, wherein washing comprises washing the PPS polymer with the base or the solvent after discharging the PPS polymer from the polymerization vessel.

6. The method as recited in claim 5, wherein an oligomer content of the PPS is reduced by about 33%.

7. The method as recited in claim 1, wherein washing the PPS polymer comprises adding the base to a water wash of the PPS polymer, then washing the PPS polymer with the water wash.

8. The method as recited in claim 1, wherein the sulfur compound comprises sodium sulfide ($Na_2S$), the dihaloaromatic compound comprises p-dichlorobenzene (DCB), and the polar organic compound comprises N-methyl-2-pyrrolidone (NMP).

9. The method as recited in claim 1, wherein the sulfur compound comprises sodium N-methyl-4-aminobutanoate (SMAB) and sodium hydrosulfide (NaSH), the dihaloaromatic compound comprises p-dichlorobenzene (DCB), and the polar organic compound comprises N-methyl-2-pyrrolidone (NMP).

10. The method as recited in claim 1, wherein washing comprises adding the base to the polymerization mixture prior to termination of the reaction of the sulfur source and the dihaloaromatic compound.

11. The method as recited in claim 1, wherein washing comprises adding the base to raise the pH of the polymerization mixture to at least 10.

12. The method as recited in claim 1, wherein washing comprises adding the base to the polymerization vessel after termination of the reaction of the sulfur source and the dihaloaromatic compound.

13. The method as recited in claim 12, wherein flash evaporating comprises lowering a pressure in the polymerization vessel to flash evaporate the polar organic compound from the polymerization mixture.

14. The method as recited in claim 1, wherein washing the PPS polymer comprises washing the PPS polymer with the base after discharging the PPS polymer from the polymerization vessel.

15. The method as recited in claim 1, wherein washing the PPS polymer comprises adding the base to a water wash of the PPS polymer to increase a pH of the water wash to at least about 10.

16. A process for manufacturing a product comprising PPS polymer, the process comprising:

forming a PPS polymer into a product, the PPS polymer being produced by a method comprising:

reacting a sulfur source and a dihaloaromatic compound in a presence of a polar organic compound in a polymerization mixture in a polymerization vessel to form the PPS polymer;

flash evaporating at least a portion of the polar organic compound from the polymerization mixture to terminate the reaction of the sulfur source and the dihaloaromatic compound; and washing the PPS polymer with a base or a solvent comprising n-methyl pyrrolidone (NMP) to lower an oligomer content of the PPS polymer.

17. The process as recited in claim 16, wherein the act of forming a PPS polymer into a product comprises subjecting the PPS polymer to at least one of heating, melting, blending, compounding, injection molding, blow molding, precision molding, film-blowing, or extrusion.

* * * * *